(12) United States Patent
Nestico et al.

(10) Patent No.: US 10,794,281 B2
(45) Date of Patent: Oct. 6, 2020

(54) GAS TURBINE ENGINE HAVING INSTRUMENTED AIRFLOW PATH COMPONENTS

(71) Applicant: General Electric Company, Schenectady, NY (US)

(72) Inventors: Brian Francis Nestico, Loveland, OH (US); Brian K. Kestner, Cincinnati, OH (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 363 days.

(21) Appl. No.: 15/013,152

(22) Filed: Feb. 2, 2016

(65) Prior Publication Data
US 2017/0218841 A1    Aug. 3, 2017

(51) Int. Cl.
*F02C 7/042* (2006.01)
*F02C 7/057* (2006.01)
(Continued)

(52) U.S. Cl.
CPC .............. *F02C 7/042* (2013.01); *F01D 17/08* (2013.01); *F01D 17/14* (2013.01); *F02C 7/057* (2013.01);
(Continued)

(58) Field of Classification Search
CPC .. F10D 17/08; F05D 2240/12; F05D 2270/10; F05D 2270/101; F05D 2270/301;
(Continued)

(56) References Cited

U.S. PATENT DOCUMENTS 2,604,278 A    7/1952   Johnson
2,857,092 A *  10/1958  Campbell ............. F01D 17/162
                                                            415/115
(Continued)

FOREIGN PATENT DOCUMENTS

CN    1654804 A    8/2005
CN    1975130 A    6/2007
(Continued)

OTHER PUBLICATIONS

European Search Report issued in connection with corresponding EP Application No. 17143889.5 dated Jul. 17, 2017.
(Continued)

*Primary Examiner* — Alain Chau
(74) *Attorney, Agent, or Firm* — Dority & Manning, P.A.

(57) ABSTRACT

Instrumented airflow path components configured to determine airflow path distortion in an airflow path of a gas turbine engine (e.g., using for propulsion of an aircraft) are provided. In one embodiment, a gas turbine engine for an aircraft can include a compressor section, a combustion section, and turbine section in series flow. The compressor section, combustion section, and turbine section define at a portion of an engine airflow path for the gas turbine engine. The gas turbine engine further includes one or more members extending at least partially into the engine airflow path of the gas turbine engine and one or more pressure sensor devices at least partially integrated into the one or more members extending at least partially into the engine airflow path. The one or more pressure sensor devices are configured to obtain measurements for determining a distortion condition for the gas turbine engine.

20 Claims, 8 Drawing Sheets

(51) Int. Cl.
  *F01D 17/08* (2006.01)
  *F04D 27/00* (2006.01)
  *F04D 27/02* (2006.01)
  *F01D 17/16* (2006.01)
  *B64D 33/02* (2006.01)
  *F01D 17/14* (2006.01)

(52) U.S. Cl.
  CPC ........... *F04D 27/001* (2013.01); *F04D 27/02* (2013.01); *B64D 33/02* (2013.01); *F01D 17/162* (2013.01); *F05D 2240/12* (2013.01); *F05D 2270/10* (2013.01)

(58) Field of Classification Search
  CPC .... F02C 7/042; F02C 7/00; F02C 9/18; F02C 7/04; F01D 17/162; F01D 17/02; F01D 17/08; F04D 27/001; F04D 27/02; F04D 27/0223; F02K 3/075; F02K 3/077; B64D 33/02; B64D 2033/0286; B64D 2033/0293
  See application file for complete search history.

(56) References Cited

U.S. PATENT DOCUMENTS

| | | | |
|---|---|---|---|
| 3,392,585 A | 7/1968 | Bentz et al. | |
| 3,618,876 A * | 11/1971 | Skidmore | F02C 7/042 244/53 B |
| 3,677,000 A * | 7/1972 | Thomson | F04D 27/02 415/1 |
| 3,759,091 A * | 9/1973 | Reimer | F01D 21/003 73/112.06 |
| 3,938,328 A * | 2/1976 | Klees | F02K 3/04 60/262 |
| 3,973,391 A * | 8/1976 | Reed | F01K 23/105 60/794 |
| 4,068,471 A * | 1/1978 | Simmons | F02K 3/075 60/262 |
| 4,075,833 A * | 2/1978 | Sargisson | F02C 7/045 137/15.1 |
| 4,163,365 A | 8/1979 | Frutschi | |
| 4,242,864 A * | 1/1981 | Cornett | F02K 1/17 60/226.1 |
| 4,546,605 A | 10/1985 | Mortimer et al. | |
| 4,852,343 A | 8/1989 | Norris et al. | |
| 5,054,286 A * | 10/1991 | Stransky | F01D 17/105 137/15.1 |
| 5,058,378 A * | 10/1991 | Enderle | F02C 7/042 60/224 |
| 5,076,052 A | 12/1991 | Wildner | |
| 5,230,603 A * | 7/1993 | Day | B64D 33/02 415/118 |
| 5,284,012 A | 2/1994 | Laborie et al. | |
| 5,402,638 A * | 4/1995 | Johnson | F02K 3/075 60/204 |
| 5,448,881 A * | 9/1995 | Patterson | F02C 7/057 415/26 |
| 5,782,603 A | 7/1998 | O'Brien et al. | |
| 5,865,398 A * | 2/1999 | Pashea | B64D 33/02 244/53 B |
| 6,169,496 B1 | 1/2001 | Martin et al. | |
| 6,231,306 B1 | 5/2001 | Khalid | |
| 6,351,940 B1 * | 3/2002 | Guinan | F02C 7/04 60/226.1 |
| 6,582,183 B2 * | 6/2003 | Eveker | F04D 27/0207 415/1 |
| 6,990,798 B2 * | 1/2006 | Bouchard | F02C 7/04 137/15.1 |
| 7,216,475 B2 * | 5/2007 | Johnson | F02K 3/065 60/226.1 |
| 7,326,027 B1 | 2/2008 | Skoch | |
| 7,637,455 B2 * | 12/2009 | Silkey | B64D 33/02 244/204 |
| 7,811,049 B2 | 10/2010 | Xu | |
| 7,827,803 B1 | 11/2010 | Wadia et al. | |
| 7,861,578 B2 | 1/2011 | Adibhatla et al. | |
| 7,878,005 B2 * | 2/2011 | Bradbrook | F01D 19/00 60/226.1 |
| 7,891,163 B2 | 2/2011 | Richards | |
| 8,112,983 B2 * | 2/2012 | Bradbrook | F01D 19/00 60/204 |
| 8,313,280 B2 | 11/2012 | Hurwitz et al. | |
| 8,478,473 B2 | 7/2013 | Adibhatla | |
| 8,514,103 B2 | 8/2013 | Maris | |
| 8,550,767 B2 | 10/2013 | Horn et al. | |
| 8,641,367 B2 * | 2/2014 | Norris | F01D 17/162 415/115 |
| 8,661,832 B2 * | 3/2014 | Griffin | F02C 9/18 60/779 |
| 8,740,548 B2 * | 6/2014 | Rowe | F01D 17/162 415/1 |
| 8,844,553 B2 * | 9/2014 | Zysman | B64D 33/02 137/15.1 |
| 9,194,301 B2 | 11/2015 | Parente | |
| 9,482,236 B2 | 11/2016 | Khalid et al. | |
| 9,777,633 B1 | 10/2017 | Nestico et al. | |
| 10,443,428 B2 * | 10/2019 | Xu | F02C 7/18 |
| 2003/0035719 A1 | 2/2003 | Wadia et al. | |
| 2003/0132342 A1 * | 7/2003 | Koncsek | B64D 33/02 244/53 B |
| 2005/0229605 A1 * | 10/2005 | Bouchard | F02C 7/04 60/793 |
| 2007/0119150 A1 * | 5/2007 | Wood | F02K 3/06 60/226.1 |
| 2008/0155989 A1 * | 7/2008 | Roth | F04D 27/0223 60/804 |
| 2009/0003997 A1 | 1/2009 | Jain et al. | |
| 2009/0169367 A1 | 7/2009 | Wadia et al. | |
| 2009/0196739 A1 * | 8/2009 | Tsuchiya | F04D 29/522 415/119 |
| 2009/0297334 A1 * | 12/2009 | Norris | F01D 17/08 415/49 |
| 2010/0023238 A1 | 1/2010 | Adibhatla | |
| 2010/0024536 A1 | 2/2010 | Adibhatla et al. | |
| 2010/0040453 A1 | 2/2010 | Vo | |
| 2010/0329851 A1 * | 12/2010 | Nilsson | F01D 5/148 415/151 |
| 2011/0056210 A1 * | 3/2011 | Griffin | F02C 9/18 60/773 |
| 2011/0167831 A1 * | 7/2011 | Johnson | F04D 27/0207 60/773 |
| 2011/0171007 A1 * | 7/2011 | Johnson | F02C 7/042 415/145 |
| 2011/0176913 A1 | 7/2011 | Wassynger et al. | |
| 2013/0103323 A1 * | 4/2013 | Snider | F01D 17/08 702/24 |
| 2013/0145744 A1 * | 6/2013 | Lo | F02C 6/08 60/226.3 |
| 2013/0319009 A1 | 12/2013 | Parente | |
| 2013/0319099 A1 | 12/2013 | Kishino et al. | |
| 2014/0013765 A1 | 1/2014 | Studerus et al. | |
| 2014/0026588 A1 | 1/2014 | Velez | |
| 2014/0075956 A1 | 3/2014 | Patsouris | |
| 2014/0083176 A1 | 3/2014 | Rhoden | |
| 2014/0093350 A1 * | 4/2014 | Meisner | F02C 9/52 415/1 |
| 2014/0182292 A1 * | 7/2014 | Hudon | F01D 21/003 60/722 |
| 2014/0303832 A1 | 10/2014 | Skertic | |
| 2016/0208715 A1 * | 7/2016 | Ruberte Sanchez | F02C 9/18 |
| 2016/0237910 A1 | 8/2016 | Saito et al. | |
| 2016/0326903 A1 | 11/2016 | Xu | |
| 2016/0348531 A1 * | 12/2016 | Rice | F01D 17/08 |
| 2017/0218841 A1 * | 8/2017 | Nestico | F02C 7/042 |
| 2017/0218842 A1 | 8/2017 | Nestico et al. | |
| 2017/0218854 A1 | 8/2017 | Nestico et al. | |
| 2017/0284296 A1 | 10/2017 | Nestico et al. | |

(56) References Cited

U.S. PATENT DOCUMENTS

| | | | |
|---|---|---|---|
| 2017/0284297 A1 | 10/2017 | Nestico et al. | |
| 2017/0284304 A1 | 10/2017 | Nestico et al. | |

FOREIGN PATENT DOCUMENTS

| | | | | |
|---|---|---|---|---|
| CN | 104619958 A | 5/2015 | | |
| DE | 3333437 A1 | 4/1985 | | |
| EP | 0628727 B1 | 12/1994 | | |
| EP | 1522710 A2 | 4/2005 | | |
| EP | 1942259 A2 | 7/2008 | | |
| EP | 2713015 A2 | 4/2014 | | |
| EP | 2998522 A2 | 3/2016 | | |
| EP | 3225815 A1 | 10/2017 | | |
| FR | 3004749 A1 | 10/2014 | | |
| GB | 867849 A | 5/1961 | | |
| GB | 1238897 A | 7/1971 | | |
| GB | 2005356 A | 4/1979 | | |
| GB | 2294094 A | 4/1996 | | |
| GB | 2452026 A | * | 2/2009 | ............... G01F 1/46 |
| JP | S5756699 A | 4/1982 | | |
| JP | S5859399 A | 4/1983 | | |
| JP | S59196929 A | 8/1984 | | |
| JP | 2010/031841 A | 2/2010 | | |
| JP | 2010/031842 A | 2/2010 | | |
| JP | 2010/534787 A | 11/2010 | | |
| JP | WO2015064428 A1 | 3/2017 | | |
| JP | 2017/180459 A | 10/2017 | | |
| WO | WO2015/064428 A1 | 5/2015 | | |

OTHER PUBLICATIONS

Japanese Office Action issued in connection with JP Application No. 2017-009052 dated Feb. 20, 2018.

Machine Translation and Notifications of Reasons for Refusal in Connection with Corresponding JP Application No. 2017/052026 dated Apr. 27, 2018.

Machine Translation and Notification of Reasons for Refusal Issued in Connection with Corresponding JP Application No. 2017-050699 dated May 15, 2018.

Machine Translation and Notification of Reasons for Refusal Issued in Connection with Corresponding JP Application No. 2017-009053 dated Feb. 20, 2018.

Machine Translation and First Office Action and Search Issued in Connection with Corresponding CA Application No. 2955395 dated Jan. 31, 2018.

Machine Translation and Office Action and Search Issued in Connection with Corresponding CA Application No. 2960906 dated Feb. 9, 2018.

Machine Translation and Office Action and Search Issued in Connection with Corresponding CA Application No. 2960920 dated Apr. 30, 2018.

Machine Translation and First Office Action and Search Issued in Connection with Corresponding CN Application No. 201710056310.9 dated Jan. 22, 2018.

Machine Translation and First Office Action and Search Report Issued in Connection with Corresponding CN Application No. 201710201951.9 dated Aug. 2, 2018.

Machine Translation and First Office Action and Search Issued in Connection with Corresponding CN Application No. 20170205149.7 dated Aug. 3, 2018.

European Search Report Issued in Connection with Corresponding EP Application No. 17153589.1 dated Jun. 8, 2017.

EP Search Report Issued in Connection with Corresponding EP Application No. 17163219.3 dated Aug. 11, 2017.

EP Search Report and Written Opinion Issued in Connection with Corresponding EP Application No. 17163223.5 dated Aug. 7, 2017.

Cotta Transmission Company LLC, Technical: Efficiency and Heat Rejection http://www.cotta.com/efficiency-and-heat-rejection.

NASA, Static Pressure Measurement, Mar. 1, 2014, 2 Pages.

KAMPF, Why Do Turbofan Engines Have Low Pressure Compressors, Aviation Stack Exchange, Sep. 2015, 2 Pages.

Canadian Office Action Corresponding to Application 2955539 dated Dec. 20, 2017.

Canadian Office Action Corresponding to Application 2955461 dated Dec. 28, 2017.

Canadian Office Action Corresponding to Application 2955461 dated Aug. 7, 2018.

Canadian Office Action Corresponding to Application 2960920 dated Jan. 31, 2019.

Chinese Office Action Corresponding to Application 2017100561654 dated Feb. 2, 2018.

Chinese Office Action Corresponding to Application 201710056206X dated Aug. 28, 2018.

Chinese Office Action Corresponding to Application 2017100561654 dated Nov. 5, 2018.

Chinese Office Action Corresponding to Application 2017102019519 dated Feb. 26, 2019.

Chinese Office Action Corresponding to Application 2017102051497 dated May 7, 2019.

Chinese Office Action Corresponding to Application 201710056206X dated May 15, 2019.

Chinese Office Action Corresponding to Application 2017100561654 dated Jun. 4, 2019.

Chinese Office Action Corresponding to Application 2017102019519 dated Jul. 31, 2019.

European Search Report Corresponding to Application 171529209 dated Jun. 2, 2017.

European Search Report Corresponding to Application 171538895 dated Jul. 17, 2017.

European Search Report Corresponding to Application 171632219 dated Aug. 22, 2017.

European Office Action Corresponding to Application 171529209 dated Sep. 21, 2018.

European Office Action Corresponding to Application 171632235 dated Apr. 2, 2019.

European Office Action Corresponding to Application 171529209 dated Jul. 1, 2019.

Japanese Office Action Corresponding to Application 2017050699 dated Dec. 4, 2018.

* cited by examiner

GAS TURBINE ENGINE HAVING INSTRUMENTED AIRFLOW PATH COMPONENTS

FIELD OF THE INVENTION

The present subject matter relates generally to a gas turbine engine, or more particularly to an instrumented guide vane for use in a gas turbine engine.

BACKGROUND OF THE INVENTION

A gas turbine engine generally includes a core having, in serial flow order, a compressor section, a combustion section, a turbine section, and an exhaust section. During operation, an engine airflow is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the combustion section drives the compressor section and is then routed through the exhaust section (e.g., to atmosphere).

In many cases, sufficient stall margin (e.g., a minimum distance between the airflow and air pressure operating points of the compressor section and a predicted stall line corresponding to compressor section stall conditions) should be maintained for the gas turbine engine to be operated safely. During operation, the gas turbine engine may encounter airflow distortion in the engine airflow path at the inlet of the compressor section, such as a circumferential or local flow disruption due to the angle of attack of the gas turbine engine, a cross wind, or any other inlet anomaly. Airflow distortion can be so uneven during operation as to put portions of the compressor section at or below proper stall pressure ratios. During the design phase of the development of the gas turbine engine, the stall margin for operation of the gas turbine engine may need to be increased to account for airflow distortion. For applications subject to significant airflow distortion during operation, increasing the stall margin to account for airflow distortion can decrease overall efficiency of the gas turbine engine due to the extra stall margin that may not be needed during periods of operation in which airflow distortion is not present.

During the design and testing phases of gas turbine engine development, pressure sensors can be temporarily located at the inlet of the compressor section to determine airflow distortion patterns. However, these temporary pressure sensors pose a potential domestic object debris risk to the gas turbine engine should one of the sensors become dislodged during normal operation.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a gas turbine engine for an aircraft. The gas turbine engine includes a compressor section, a combustion section, and a turbine section in series flow. An engine airflow can flow through the compressor section, the combustion suction, and turbine section of the gas turbine engine in an engine airflow path. The gas turbine can further include one or more members extending at least partially into the engine airflow path of the gas turbine engine. The members extending at least partially into the engine airflow path can include one or more pressure sensor devices at least partially integrated into the one or more members. The pressure sensor devices can be configured to obtain measurements for determining a distortion condition for the gas turbine engine.

Another example aspect of the present disclosure is directed to a guide vane for guiding airflow through a gas turbine engine. The guide vane can include a leading edge, a pressure side, and a suction side. The guide vane can extend at least partially into an engine airflow path of the gas turbine engine. The guide vane can further include one or more pressure sensor devices configured to obtain measurements from the engine airflow path for determining a distortion condition of the gas turbine engine.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
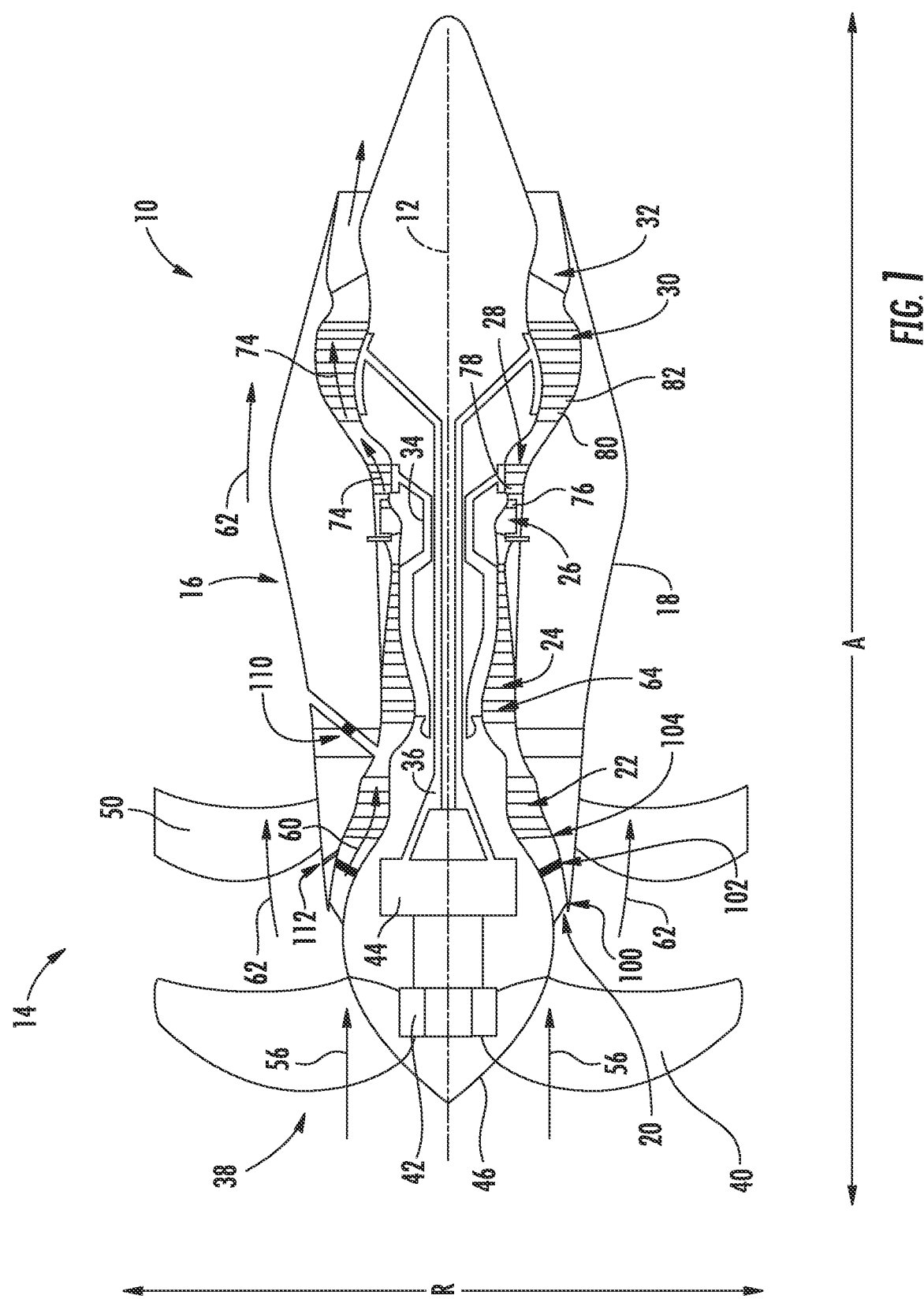
FIG. 1 is a schematic, cross-sectional view of a gas turbine engine according to example embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to a gas turbine engine having instrumented components that can be used to determine airflow distortion in the engine airflow path of the gas turbine engine. Airflow distortion occurs when the airflow into the engine airflow path is non-uniform, such as in airflow direction, airflow speed, or air pressure profile. For applications in which the inlet to the compressor section of the gas turbine engine is downstream of a propeller, the gas turbine engine can experience a significant amount of airflow distortion, particularly when the gas turbine engine is operated at a high angle of attack, such as during takeoff. Airflow distortion can cause portions of the compressor section to operate at or below the stall margin that may be desired for safe operation. Thus, during the design phase of the gas turbine engine, sufficient stall margin headroom to account for airflow distortion can be desired to provide that the gas turbine engine can be operated safely. However, for applications subject to significant airflow distortion patterns, operating the gas turbine engine at an increased stall margin to account for airflow distortion can cause the gas turbine engine performance to decrease, resulting in less efficient operation.

The gas turbine engine and, in particular, the instrumented components (e.g., instrumented guide vanes) according to example aspects of the present disclosure can allow for real-time measurement of airflow distortion in the engine airflow path of the gas turbine engine. Once obtained, this data can be used by a controller of the gas turbine engine to manage the stall margin headroom of the gas turbine engine in real time, thereby enhancing the efficiency of the gas turbine engine.

For example, in one embodiment, multiple pressure taps can be integrated into a structural member (e.g. a guide vane or strut) located within the engine airflow path of the gas turbine engine. For example, the guide vane can be a stationary guide vane located at the inlet to the compressor section of the gas turbine engine, or the guide vane can be a variable guide vane located downstream of the inlet to the compressor. Using, for instance, additive manufacturing, the pressure taps can be manufactured directly into the guide vane, and operatively connected to local transducers, thereby allowing pressure measurements to be taken at various positions in the engine airflow path. Each pressure tap can be configured to have an inlet that can be spaced to measure air pressure at different locations on the guide vane. For example, the taps can be located radially along a leading edge of the guide vane, thereby allowing pressure measurements to be taken of the airflow into the face of the engine. Using these pressure measurements, the controller of the gas turbine engine can determine whether portions of the engine airflow path are experiencing airflow distortion in a radial direction.

In another embodiment, multiple pressure taps can be integrated on both a pressure side and a suction side of a guide vane located within the engine airflow path of the gas turbine engine. Each tap can be configured to have an inlet spaced to measure air pressure on either the pressure side or suction side of the guide vane. Using pressure measurements from both the pressure and suction sides of the guide vane, the controller of the gas turbine engine can determine whether there is airflow distortion in the engine airflow path, such as airflow separation over the guide vane.

In another embodiment, multiple instrumented guide vanes can be positioned in a circumferential array, thereby allowing pressure measurements to be taken in a circumferential plane of the gas turbine engine. Using these pressure measurements, the controller of the gas turbine engine can determine whether portions of the engine airflow path are experiencing airflow distortion.

Once pressure measurements are obtained, the controller of the gas turbine engine can determine whether airflow distortion is present in the engine airflow path of the gas turbine engine. The controller can then control various components of the gas turbine engine to operate the gas turbine engine in an enhanced state based on the airflow distortion. Further, the controller can control various components to mitigate the airflow distortion.

In this way, instrumented components according to example aspects of the present disclosure can have a technical effect of allowing airflow distortion to be sensed in real-time during operation of a gas turbine engine. Further, example aspects of the present disclosure can allow the stall margin of the compressor section of the gas turbine engine to be managed in real-time by the controller of the gas turbine engine, allowing for more efficient operation of the gas turbine engine and reducing operating costs. Further, example aspects of the present disclosure can allow distortion mitigation techniques to be implemented in real-time by the controller, such as opening/closing variable guide vanes at the inlet to the compressor section, opening/closing variable bleed valves in the compressor section, or controlling other variable geometry components in a gas turbine engine.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the term "optimization" or "optimized" refers to determining an enhanced operating state with respect to a prior operating state. For example, the enhanced operating state may be more efficient, reduce fuel consumption, reduce the time required to perform an action, or increase safety.

Referring now to the drawings, wherein identical numerals indicate the same elements throughout the figures, FIG. 1 is a schematic cross-sectional view of a gas turbine engine in accordance with an example embodiment of the present disclosure. More particularly, for the embodiment of FIG. 1, the gas turbine engine is a high-bypass turbofan jet engine 10, referred to herein as "gas turbine engine 10." Example aspects of the present disclosure can be used with other suitable gas turbine engines without deviating from the scope of the present disclosure.

As shown in FIG. 1, the gas turbine engine 10 defines an axial direction A (extending parallel to a longitudinal centerline 12 provided for reference) and a radial direction R. The gas turbine engine 10 also defines a circumferential direction (not depicted). In general, the gas turbine engine 10 includes a fan section 14 and a core engine 16, the fan section 14 configured in mechanical communication and positioned in flow communication with the core engine 16.

The example core engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, the fan section 14 includes a variable pitch fan 38 having a plurality of fan blades 40 coupled to a disk 42 in a spaced apart manner. As depicted, the fan blades 40 extend outwardly from the disk 42 generally along the radial direction R. The fan blades 40 and disk 42 are together rotatable about the longitudinal centerline 12 by LP shaft 36 across a power gear box 44. The power gear box 44 includes a plurality of gears for adjusting the rotational speed of the LP shaft 36. Additionally, for the embodiment depicted, the disk 42 of the variable pitch fan 38 is covered by a rotatable front hub 46 aerodynamically contoured to promote an airflow through the plurality of fan blades 40.

Referring still to the example gas turbine engine 10 of FIG. 1, the example gas turbine engine 10 additionally includes a plurality of circumferentially-spaced outlet guide vanes 50. The plurality of outlet guide vanes 50 are positioned downstream from the fan 38 along the axial direction A and extend outwardly from the outer casing 18 of the core engine 16 generally along the radial direction R. Each outlet guide vane 50 defines a center of pressure 52 and a pitch axis P extending substantially parallel to the radial direction R. Notably, for the embodiment depicted, the gas turbine engine 10 does not include any outer casing enclosing the fan section 14 and/or outlet guide vanes 50. Accordingly, for the embodiment depicted, the gas turbine engine 10 may be referred to as an un-ducted single fan gas turbine engine 10.

For the example gas turbine engine 10 depicted, the fan section 14, or more particularly, the rotation of the fan blades 40 of the fan section 14, provides a majority of the propulsive thrust of the gas turbine engine 10. Additionally, the plurality of outlet guide vanes 50 are provided to increase an efficiency of the fan section 14 as well as to provide other benefits, such as, for example, decreasing an amount of noise generated by the gas turbine engine 10.

During operation of the gas turbine engine 10, a volume of air 56 passes over the plurality of blades 40 of the fan section 14. A first portion of the volume of air 56, i.e., the first portion of air 60, is directed or routed into an engine airflow path 64 extending through the compressor section, the combustion section 26, the turbine section, and the exhaust section 32. Additionally, a second portion of the volume of air 56, e.g., a second portion of air 62, flows around the core engine 16, bypassing the core engine 16. The ratio between the second portion of air 62 and the first portion of air 60 is commonly known as a bypass ratio.

Referring still to FIG. 1, the pressure of the first portion of air 60 is increased as it is routed through the LP compressor 22 and subsequently through the HP compressor 24. The compressed first portion of air 60 is then provided to the combustion section 26, where it is mixed with fuel and burned to provide combustion gases 74. The combustion gases 74 are routed through the HP turbine 28 where a portion of thermal and/or kinetic energy from the combustion gases 74 is extracted via sequential stages of HP turbine stator vanes 76 that are coupled to the outer casing 18 and HP turbine rotor blades 78 that are coupled to the HP shaft or spool 34, thus causing the HP shaft or spool 34 to rotate, thereby supporting operation of the HP compressor 24. The combustion gases 74 are then routed through the LP turbine 30 where a second portion of thermal and kinetic energy is extracted from the combustion gases 74 via sequential stages of LP turbine stator vanes 80 that are coupled to the outer casing 18 and LP turbine rotor blades 82 that are coupled to the LP shaft or spool 36, thus causing the LP shaft or spool 36 to rotate, thereby supporting operation of the LP compressor 22 and/or rotation of the fan 38. The combustion gases 74 are subsequently routed through the jet exhaust nozzle section 32 of the core engine 16 to provide propulsive thrust to supplement propulsive thrust provided by the fan section 14.

Referring still to FIG. 1, downstream of an annular inlet 20 is one or more inlet guide vanes 100. In certain example embodiments, inlet guide vane 100 may be configured to open or close, thereby restricting the flow of the first portion of air 60 into the engine airflow path 64 extending through the compressor section. In certain example embodiments, inlet guide vane 100 can be an instrumented guide vane 400 according to example embodiments of the present disclosure as depicted, for instance, in FIGS. 3 and 4.

Downstream of inlet guide vane 100 is one or more struts 102 configured to mechanically couple outer casing 18 to the core engine 16. Strut 102 extends into the engine airflow path 64 where first portion of air 60 flows over strut 102. In certain example embodiments, strut 102 is configured to obtain pressure measurements. Downstream of strut 102 is one or more variable guide vanes 104. Variable guide vanes 104 are configured to open or close, thereby restricting the flow of the first portion of air 60 into the engine airflow path 64 extending through the compressor section. In certain example embodiments, variable guide vane 104 can be an instrumented variable guide vane 400 according to example embodiments of the present disclosure as shown, for instance, in FIGS. 3 and 4. In certain embodiments, a circumferential array of variable guide vanes 104 can extend into engine airflow path 64, and sectors of the circumferential array of variable guide vanes 104 can be controlled to open or close as shown, for instance, in FIG. 7.

Referring still to FIG. 1, variable bleed valve 110 is downstream of LP compressor 22. Variable bleed valve 110 can be opened to reduce pressure in the engine airflow path 64 downstream of LP compressor 22. In one embodiment, variable bleed valve 110 can be opened to allow compressed air downstream of LP compressor 22 in the engine airflow path 64 to be routed to the atmosphere, thereby reducing pressure in engine airflow path 64 to improve the operability of gas turbine engine 10, increase the stall margin of LP compressor 22, or mitigate airflow mismatch between LP compressor 22 and HP compressor 24. In another embodiment, variable bleed valve 110 can be opened to route compressed air to cool various components of the gas turbine engine 10.

Referring still to FIG. 1, variable core inlet device 112 is secondary airflow passage located downstream of annular inlet 20 in the flow path of the second portion of air 62. Variable core inlet device 112 can be opened to allow additional air from second portion of air 62 into engine airflow path 64. In another embodiment, variable core inlet device 112 can be a translating inlet throttle integrated into annular inlet 20 that can open or close to increase or decrease the first portion of air 60 flowing into the engine airflow path 64 of the gas turbine engine 10. In another embodiment, variable core inlet device 112 can be a valved airflow passage that can be opened or closed to route compressed air from the engine airflow path 64 downstream of the LP compressor 22 into the engine airflow path 64 upstream of the LP compressor 22. In certain embodiments, one or more variable core inlet devices 112 can be a one or more local doors that can be synchronized to open or close in response to airflow distortion.

Figure 2:
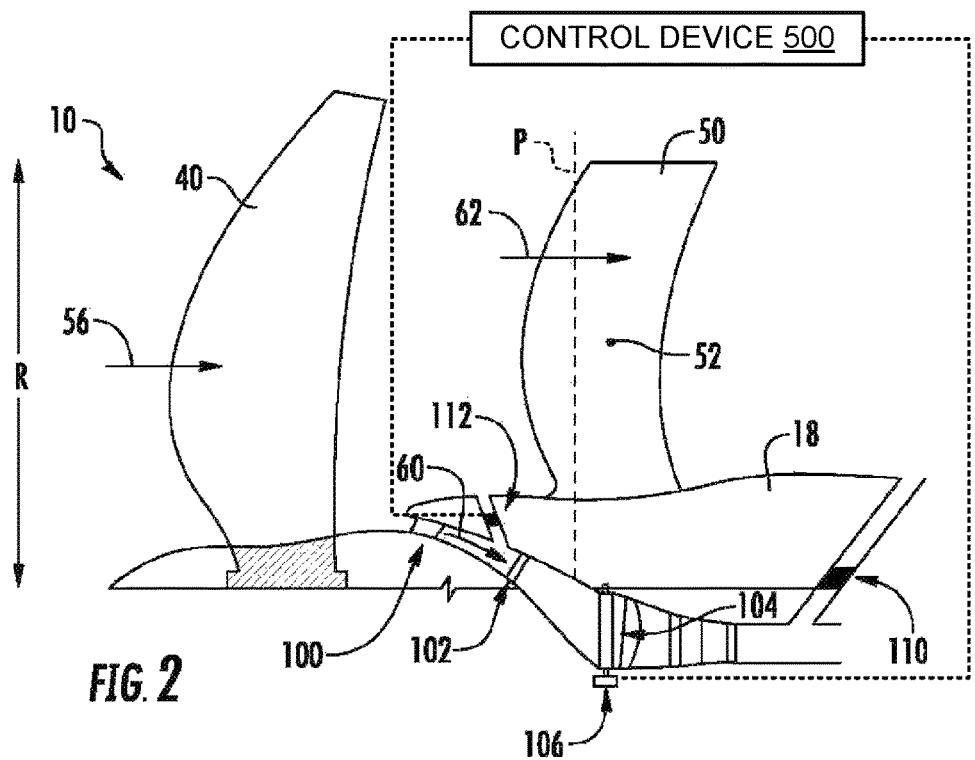
FIG. 2 is schematic, cross-sectional view of a forward end of an example gas turbine engine according to example embodiments of the present disclosure.

Referring now to FIG. 2, a close-up, cross-sectional view of a forward end of the example gas turbine engine 10 of FIG. 1 is provided. As shown, the gas turbine engine 10 includes at least one control mechanism 106 configured to adjust a variable guide vane 104. In certain example embodiments, the gas turbine engine 10 may include a plurality of control mechanisms 106, each individual control mechanism 106 configured to adjust an individual variable guide vane 104 or other member of the airflow path.

Figure 3:
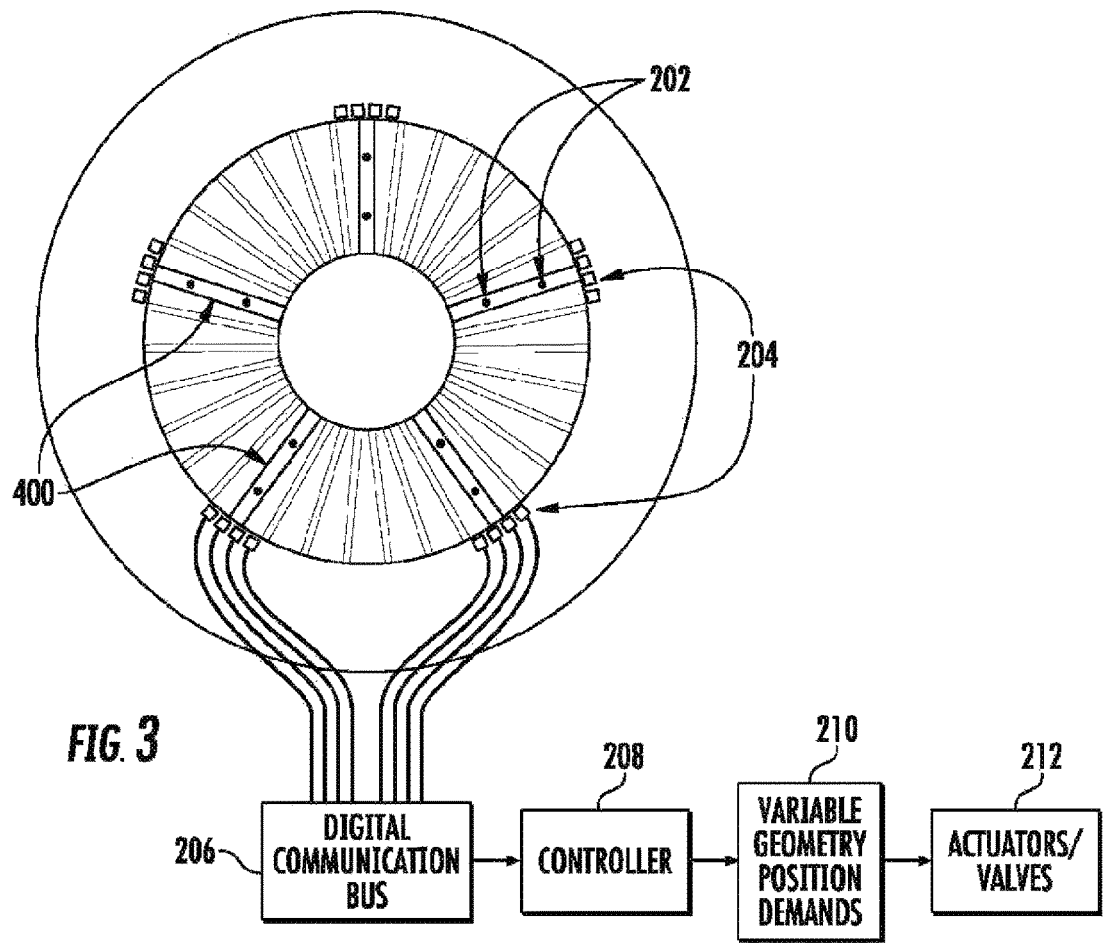
FIG. 3 is an axial view of an array of instrumented guide vanes in an example gas turbine engine according to example embodiments of the present disclosure.
Figure 4:
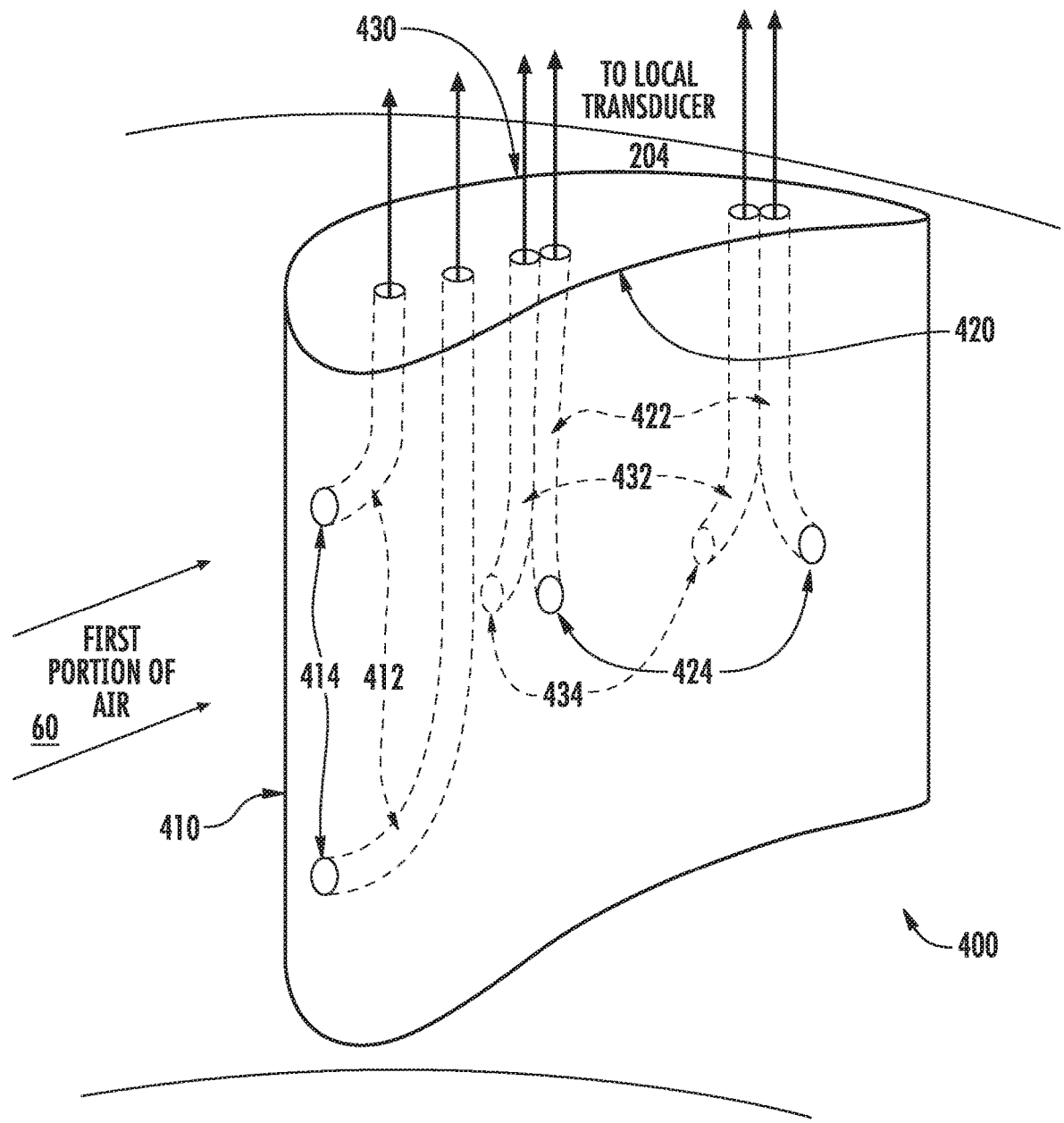
FIG. 4 is a schematic of an individual instrumented guide vane in an example gas turbine engine according to example embodiments of the present disclosure.

FIG. 3 is an axial view of an array of individual guide vanes 104 in the example gas turbine engine of FIG. 1. As shown, a plurality of individual guide vanes 104 are configured in a circumferential array located in the engine airflow path 64 upstream of the LP Compressor 22. As depicted in FIG. 3, five instrumented guide vanes 400, as discussed below in greater detail with respect to FIG. 4, are included in the array of individual guide vanes 104. As will be discussed in greater detail below with reference to FIG. 4, each individual instrumented guide vane 400 is configured with a pressure sensing device. As shown in FIG. 3, the pressure sensing device includes one or more taps 202 extending through the individual instrumented guide vane 400 and one or more local transducers 204 configured to measure an air pressure from the one or more taps 202. However, it will be apparent to those skilled in the art will that the pressure sensing device can be any suitable device configured to sense pressure without departing from the scope or spirit of the invention. As shown in FIG. 3, local transducer 204 is configured to send data indicative of an air pressure to a digital communication bus 206. Digital communication bus 206 then sends the data indicative of an air pressure to controller 208. Controller 208 then determines a variable geometry position demand 210 based on the data indicative of an air pressure sent by local transducer 204. Controller 208 then controls various actuators and valves 212 based on the variable geometry position demands 210.

FIG. 4 is a schematic of an individual instrumented guide vane 400 for an example gas turbine engine according to example embodiments of the present disclosure. Instrumented guide vane 400 can be a variable guide vane 104 or a stationary guide vane 100. As depicted in FIG. 4, instrumented guide vane 400 can be configured in a nonsymmetrical airfoil shape generally having a "tear drop" shape with a leading edge 410, a pressure side 420, and a suction side 430. However, in other example embodiments, the instrumented guide vane 400 may instead define any other suitable symmetrical or nonsymmetrical shape or configuration. In some implementations, leading edge 410 can be configured within engine airflow path 64 such that first portion of air 60 flowing downstream of annular inlet 20 first comes into contact with leading edge 410 before flowing over pressure side 420 and suction side 430 and continuing into LP compressor 22.

Referring still to FIG. 4, one or more leading edge taps 412, pressure side taps 422 and/or suction side taps 432 are integrated into instrumented guide vane 400. The leading edge taps 412, pressure side taps 422, and suction side taps 432 are depicted in phantom. As depicted in FIG. 4, two leading edge inlets 414 are spaced radially along leading edge 410 to allow air from first portion of air 60 to enter leading edge inlet 414 and flow through leading edge tap 412 to a local transducer 204 (not shown in FIG. 4). In another embodiment, a single leading edge inlet 414 and leading edge tap 412 can be integrated into leading edge 410. In another embodiment three or more leading edge inlets 414 and leading edge taps 412 can be integrated into leading edge 410.

Referring still to FIG. 4, two pressure side inlets 424 are spaced axially along pressure side 420 to allow air from first portion of air 60 to enter pressure side inlet 424 and flow through pressure side tap 422 to a local transducer 204 (not shown in FIG. 4). In another embodiment, a single pressure side inlet 424 and pressure side tap 422 are integrated into pressure side 420. In another embodiment three or more pressure side inlets 424 and pressure side taps 422 are integrated into pressure side 420.

Referring still to FIG. 4, two suction side inlets 434 are spaced axially along suction side 430 to allow air from first portion of air 60 to enter suction side inlet 434 and flow through suction side tap 432 to a local transducer 204 (not shown in FIG. 4). The suction side inlets 434 are depicted in phantom. In another embodiment a single suction side inlet 434 and suction side tap 432 are integrated into suction side 430. In another embodiment, three or more suction side inlets 434 and suction side taps 432 are integrated into suction side 430.

Referring still to FIG. 4, in an embodiment, local transducer 204 (not shown) can be configured to provide measurements of a pressure differential between a pressure side tap 422 and a suction side tap 432. In another embodiment, local transducer 204 (not shown) can be configured to provide measurements of absolute pressures from a pressure side tap 422 and a suction side tap 432.

Figure 5:
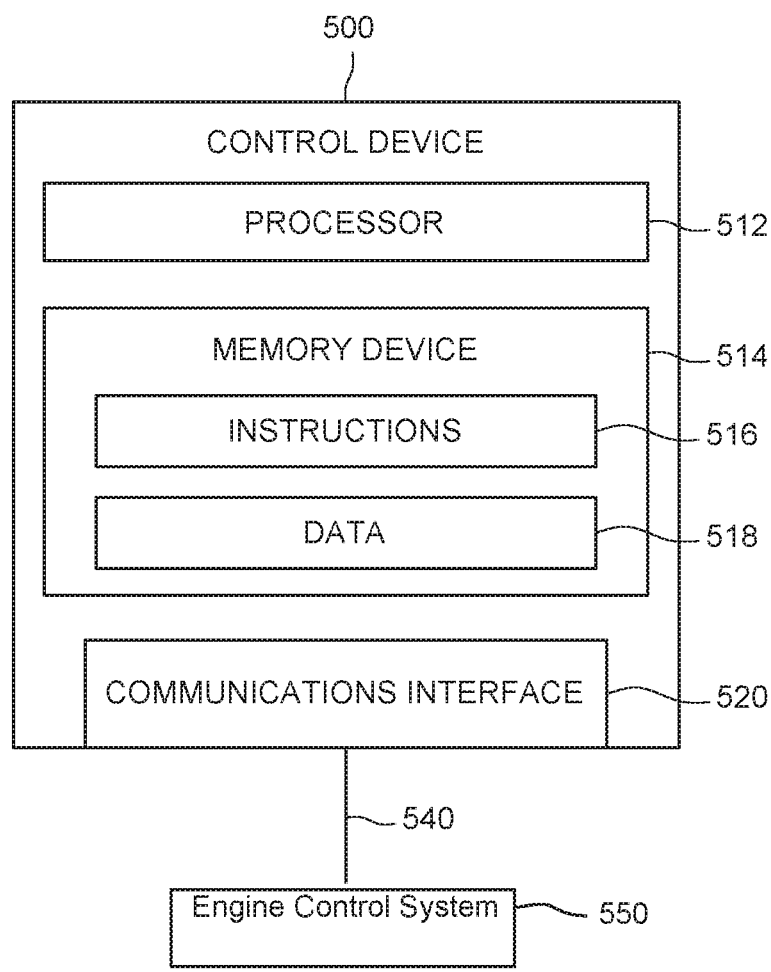
FIG. 5 depicts an example control device used in a control system according to example embodiments of the present disclosure.

FIG. 5 depicts an example control device used in a control system according to example embodiments of the present disclosure. As shown, the control device(s) 500 can include one or more processors 512 and one or more memory devices 514. The one or more processors 512 can include any suitable processing device, such as a microprocessor, microcontroller, integrated circuit, logic device, or other suitable processing device. The one or more memory devices 514 can include one or more computer-readable media, including, but not limited to, non-transitory computer-readable media, RAM, ROM, hard drives, flash drives, or other memory devices.

The one or more memory devices 514 can store information accessible by the one or more processors 512, including computer-readable instructions 516 that can be executed by the one or more processors 512. The instructions 516 can be any set of instructions that when executed by the one or more processors 512, cause the one or more processors 512 to perform operations. The instructions 516 can be implemented in software written in any suitable programming language or can be implemented in hardware. In some embodiments, the instructions 516 can be executed by the one or more processors 512 to cause the one or more processors to perform operations, such as the operations for controlling a sector of variable guide vanes to adjust a distortion condition as described with reference to FIG. 10.

Referring to FIG. 5, the memory devices 514 can further store data 518 that can be accessed by the processors 512. The data 518 can include, for instance, operating parameters, pressure measurements obtained from the engine airflow path, and other data. The data 518 can also include data associated with models and algorithms used to perform the example methods according to example aspects of the present disclosure, such as models and algorithms for determining a distortion condition.

The control device(s) 500 can further include a communications interface 520. The communications interface 520 can be configured to communicate with aircraft systems over a communication network 540. For instance, the communications interface 520 can receive data indicative of a pressure obtained by a pressure sensing device, such as a tap 202 and local transducer 204. In one embodiment, the communications interface 520 can provide control commands to an engine control system 550 that has one or more actuators to control various components of the gas turbine engine 10, such as, but not limited to, variable guide vane 104, variable bleed valve 110, and variable core inlet device 112. The communications interface 520 can include any suitable components for interfacing with one more other devices, including for example, transmitters, receivers, ports, controllers, antennas, or other suitable components.

The technology discussed herein makes computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Figure 6:
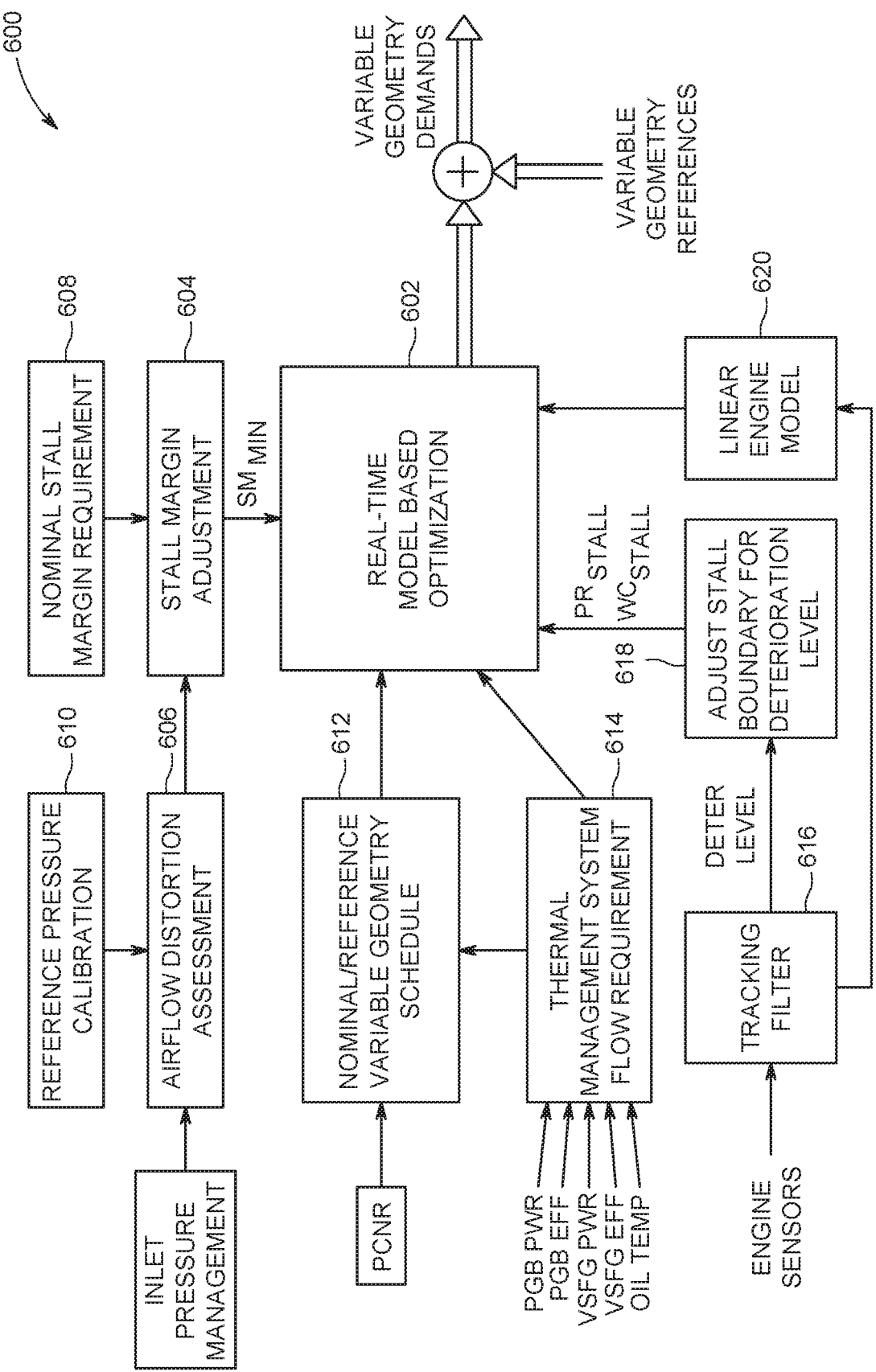
FIG. 6 depicts a schematic of an example control scheme according to example embodiments of the present disclosure.

FIG. 6 depicts an overview of a gas turbine engine control scheme 600 according to example embodiments of the present disclosure. The gas turbine engine control scheme 600 can be implemented by the control device 500 of FIG. 5. As shown in FIG. 6, a real-time model based optimization 602 can determine variable geometry trims used to control various components of the gas turbine engine 10 shown in FIG. 1. The variable geometry trims determined by the real-time model based optimization 602 can be compared to variable geometry reference schedules to determine variable geometry demands, which are sent to variable geometry components in gas turbine engine 10, such as variable guide vane 104, variable bleed valve 110, and variable core inlet device 112.

According to particular aspects of the present disclosure, a minimum stall margin ($SM_{MIN}$) can be used in real-time model based optimization 602 to determine the variable geometry trims. $SM_{MIN}$ can be determined by stall margin adjustment 604 based on an airflow distortion assessment 606 and a nominal stall margin requirement 608. In one embodiment, nominal stall margin requirement 608 can be determined from a reference schedule or lookup table. Stall margin adjustment 604 can determine the $SM_{MIN}$ by adjusting the nominal stall margin requirement 608 based on the airflow distortion assessment 606. As shown in FIG. 6, airflow distortion assessment 606 can be based on a reference pressure calibration 610 and an inlet pressure measurement. In one embodiment, the inlet pressure measurement can be obtained by one or more pressure sensing devices in the engine airflow path, such as the instrumented guide vane 400 according to example embodiments of the present disclosure or other instrumented components in the airflow path.

More particularly, using inlet pressure measurements and comparing the inlet pressure measurements to reference pressure calibrations 610, airflow distortion assessment 606 can determine whether airflow distortion is present in the engine airflow path 64 of the gas turbine engine 10. Stall margin adjustment 604 can then adjust the nominal stall margin requirement 608 based on the airflow distortion assessment 606 to determine the $SM_{MIN}$ used by the real-time model based optimization 602 to control variable geometry components of gas turbine engine 10. For example, real-time model based optimization could send a variable geometry demand to variable guide vane 104 to restrict airflow into LP compressor 22, thereby increasing the stall margin to meet $SM_{MIN}$. Further, real-time model based optimization could send a variable geometry demand to variable bleed valve 110 to open, thereby reducing pressure in LP compressor 22 to increase the stall margin to meet $SM_{MIN}$. In this way, the $SM_{MIN}$ can be adjusted in real-time to account for airflow distortion in the engine airflow path 64. By doing so, gas turbine engine 10 can be operated in an enhanced state that can increase the efficiency of gas turbine engine 10 while providing sufficient stall margin to account for airflow distortion, thereby reducing the possibility of compressor stall.

As further shown in FIG. 6, the variable geometry trims determined by real-time model based optimization 602 are also based on nominal/reference variable geometry schedule 612. Nominal/reference variable geometry schedule 612 can be based on the percent corrected speed (PCNR) of the gas turbine engine 10. Nominal/reference variable geometry schedule 612 can also be based on a thermal management system (TMS) flow requirement 614. TMS flow requirement 614 indicates the amount of compressed air needed for cooling various components of gas turbine engine 10. TMS flow requirement 614 can be based on multiple inputs, such as power gear box power (PGB PWR), power gear box efficiency (PGB EFF), variable frequency generator power (VSFG PWR), variable frequency generator efficiency (VSFG EFF), oil temperature (OIL TEMP), and other inputs. Based on these inputs, the TMS flow requirement 614 needed to cool various components of gas turbine engine 10, such as the power gear box and variable frequency generator, can be determined.

The TMS flow requirement 614 can also be used by real-time model based optimization 602 to determine variable geometry trims. For example, in one embodiment, TMS flow requirement 614 can be used by real-time model based optimization 602 to open bleed flow valve 110 to route compressed air to components of gas turbine engine 10 for cooling, such as the variable frequency generator. In this way, real-time model based optimization 602 can meet TMS flow requirement 614 in an optimized manner that also provides sufficient $SM_{MIN}$ to operate the engine in a safe manner based on the distortion condition assessment 606. For example, real-time model based optimization 602 can open bleed flow valve 110 to reduce air pressure in LP compressor 22 to achieve $SM_{MIN}$, and further use the compressed air to from opening bleed flow valve 110 to cool components of gas turbine engine 10 as determined by TMS flow requirement 614.

Referring still to FIG. 6, real-time model based optimization 602 can also be based on a stall pressure ratio ($PR_{STALL}$), a stall corrected flow ($WC_{STALL}$), and a linear engine model 620. Linear engine model 620 can be a complex multi-parameter model that is used to estimate sensed parameters associated with gas turbine engine 10, such as shaft torque, rotor speeds, temperatures, and pressures, as well as computed parameters such as thrust, airflows, stall margins, and turbine inlet temperature. The computed parameters are based on for example, but not limited to, environmental conditions, power setting parameters, and second control parameters (e.g., variable geometry positions, variable bleed valve positions, etc.) input into linear engine model 620. In some embodiments, linear engine model 620 can be a physics-based aerothermodynamics model.

As shown in FIG. 6, the linear engine model 620 can exchange data with tracking filter 616. Tracking filter 616 can receive signals from engine sensors indicative of one or more measured operating parameters associated with the gas turbine engine 10 and can be configured to compare differences between the measured operating parameters and operating parameters estimated by the linear engine model 620. The tracking filter 616 can be configured to adjust or tune parameters of the linear engine model 620 to match the measured operating parameters with the operating parameter values that are determined by the linear engine model 620. In this way, the tracking filter 616 can ensure that the linear engine model 620 continuously accurately represents the gas turbine engine 10 regardless of changes in component wear, component efficiency, and/or component failures.

Referring still to FIG. 6, tracking filter 616 can determine a deterioration (deter) level for turbomachinery components in the engine. $PR_{STALL}$ and $WC_{STALL}$ can then be determined by adjusting the stall boundary for the deterioration level 618.

Referring still to FIG. 6, the variable geometry demands determined by real-time model based optimization can also be used to adjust airflow distortion in engine airflow path 64. For example, real-time model based optimization 602 can send a variable geometry demand to variable core inlet device 112 to open or close, thereby allowing additional air into engine airflow path 64 to reduce airflow distortion. In some embodiments, as discussed in greater detail below with reference to FIG. 7, real-time model based optimization 602 can send a variable geometry demand to a sector of variable guide vanes 104 to adjust airflow distortion in engine airflow path 64.

Figure 7:
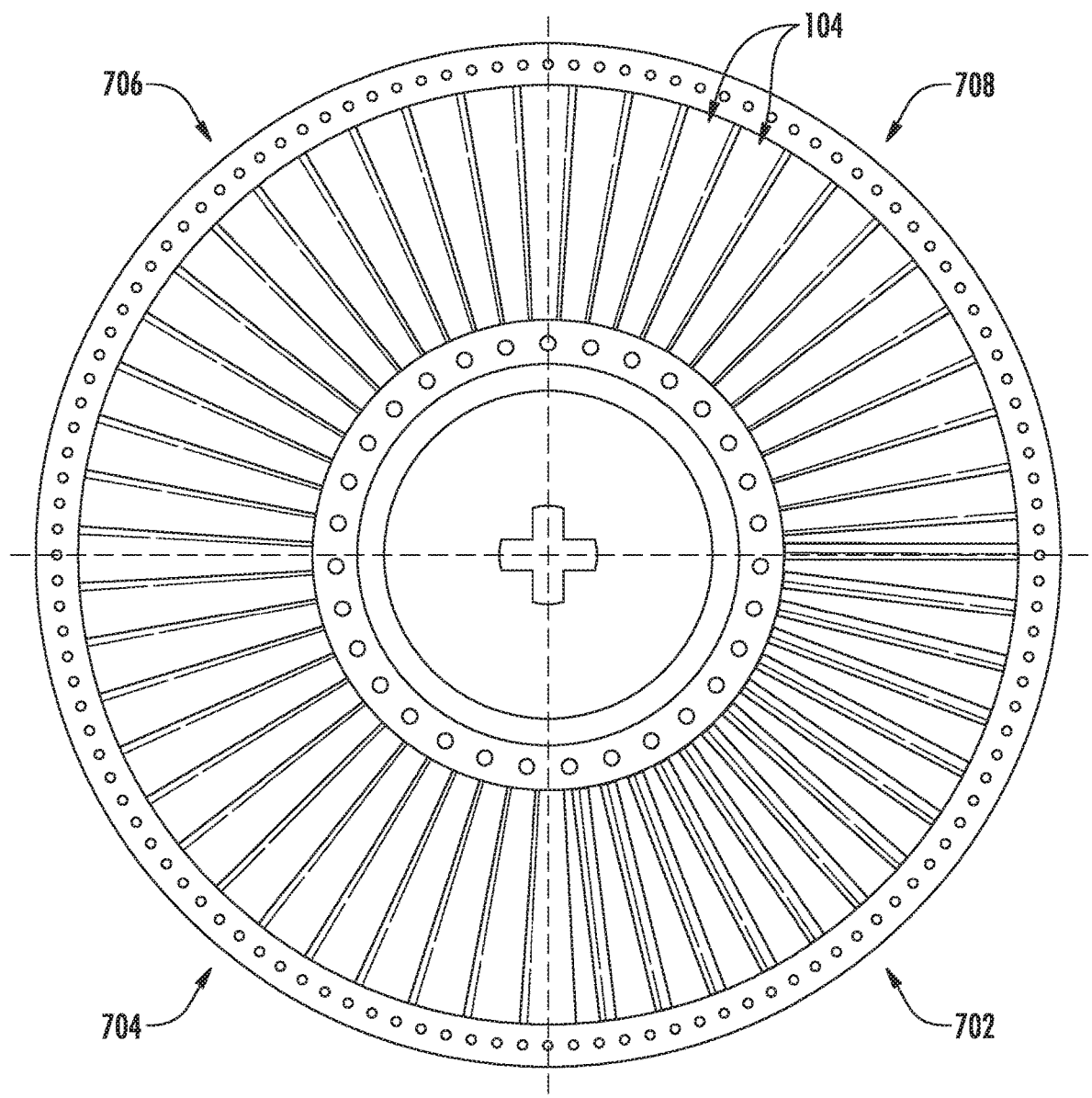
FIG. 7 depicts an axial array of variable guide vanes in an example gas turbine engine according to example embodiments of the present disclosure.

Referring now to FIG. 7, an axial view of an array of variable guide vanes in an example gas turbine engine according to example embodiments of the present disclosure is depicted. As shown in FIG. 7, variable guide vanes 104 are circumferentially spaced about a rotational axis of gas turbine engine 10. As will be discussed in greater detail with respect to FIG. 8 below, each individual variable guide vane 104 can rotate about a pitch axis to open or close so as to restrict or allow the first portion of air 60 to flow through engine airflow path 64. According to aspects of the present disclosure, the array of variable guide vanes 104 can be divided into a plurality of sectors. As depicted in FIG. 7, four sectors of individual variable guide vanes 104 are shown, a first sector 702, a second sector 704, a third sector 706, and a fourth sector 708. In another embodiment not depicted in FIG. 7, the number of sectors can be two or more sectors. Other suitable numbers of sectors can be used without deviating from the scope of the present disclosure.

According to example aspects of the present disclosure, the variable guide vanes 104 of each sector can be opened or closed in conjunction with the other variable guide vanes of that sector to adjust an airflow distortion condition associated with that sector. As used herein, the term "open" with respect to a variable guide vane means to adjust the pitch of the variable guide vane such that an increased first portion of air 60 can flow through engine airflow path 64. As used herein, the term "close" with respect to a variable guide vane means to adjust the pitch of the variable guide vane such that a decreased first portion of air 60 can flow through engine airflow path 64.

According to example aspects of the present disclosure, a pressure sensing device according to example embodiments of the present disclosure can be used to obtain measurements to determine if there is airflow distortion in engine airflow path 64. In one embodiment, one or more instrumented guide vanes 400 are configured to obtain pressure measurements associated with each sector. For example, each sector, such as a first sector 702, can have a single instrumented guide vane 400 configured to obtain pressure measurements associated with first sector 702 and a plurality of variable guide vanes 104. As described in greater detail above with respect to FIG. 6, a distortion condition assessment 606 can be determined from the pressure measurements obtained from the instrumented guide vane 400. Further, as described in greater detail above with respect to FIG. 6, a variable geometry demand can then be used to control the variable guide vanes 104 of first sector 702 to open or close based on the distortion condition assessment 606.

As shown in FIG. 7, each sector of individual guide vanes 104 can be adjusted independently of the other sectors. For example, as depicted in FIG. 7, the individual guide vanes 104 of sector 702 are open, whereas the individual guide vanes 104 of sectors 704, 706, and 708 are closed. In this way, the individual guide vanes 104 of first sector 702 can be controlled to adjust airflow distortion associated with first sector 702.

Figure 8:
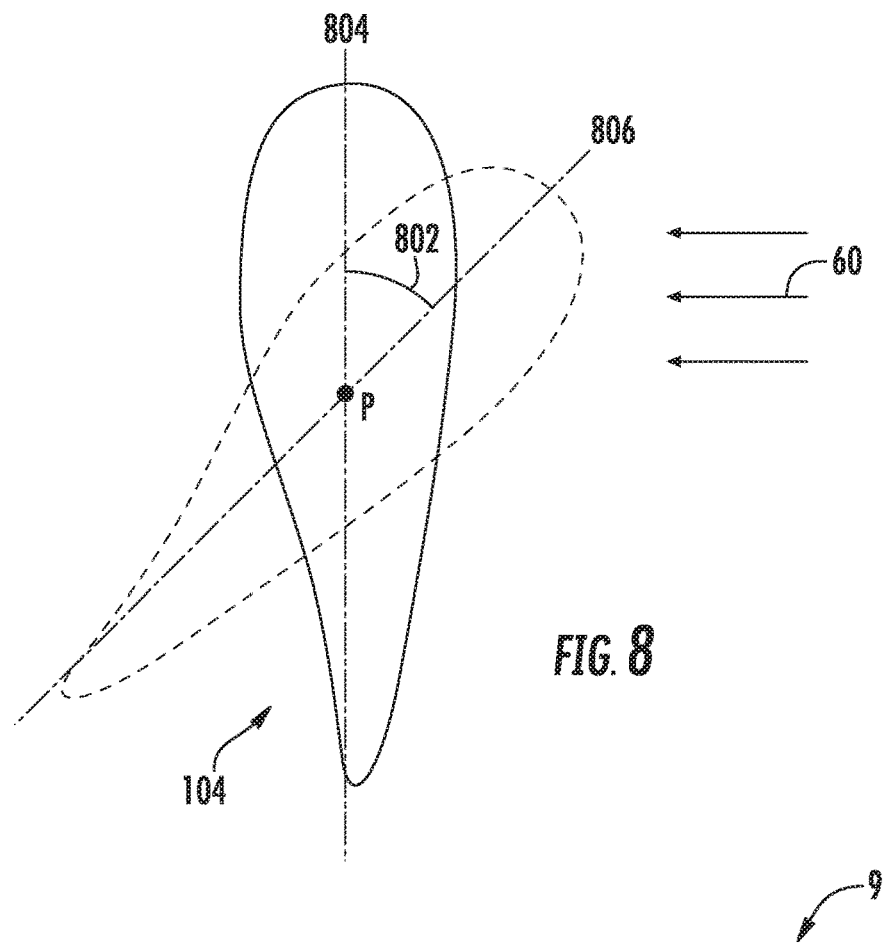
FIG. 8 is a view along a pitch axis of a variable guide vane of an example gas turbine engine in a pitched and non-pitched position according to example embodiments of the present disclosure.

Referring now to FIG. 8, a cross-sectional view is provided of the individual variable guide vane 104 along its pitch axis P. For the embodiment of FIG. 8, the variable guide vane 104 is configured as a nonsymmetrical airfoil generally having a "teardrop" shape. However, in other example embodiments, the variable guide vane 104 may instead define any other suitable symmetrical or nonsymmetrical shape or configuration.

As shown, the variable guide vane 104 is configured to rotate about a pitch axis P. FIG. 8 depicts the variable guide vane 104 in a non-pitched position 804 and depicts in phantom the variable guide vane 104 in a pitched position 806. The pitch angle 802, as used herein refers to an angle defined between a non-pitched position 804 and a pitched position 806 of the variable guide vane. As discussed in greater detail above with respect to FIG. 1, first portion of air 60 flowing through engine airflow path 64 flows over variable guide vane 104 before flowing downstream into LP compressor 22. As discussed in greater detail above with respect to FIG. 2, variable guide vane 104 can be configured to rotate about pitch axis P by control mechanism 106. For example, variable guide vane 104 can be configured to be rotated about pitch axis P by the control mechanism 106 to a desired pitch angle 802. As discussed in greater detail above with respect to FIG. 6, variable guide vane 104 can be adjusted to a desired pitch angle 802 by a variable geometry demand.

Figure 9:
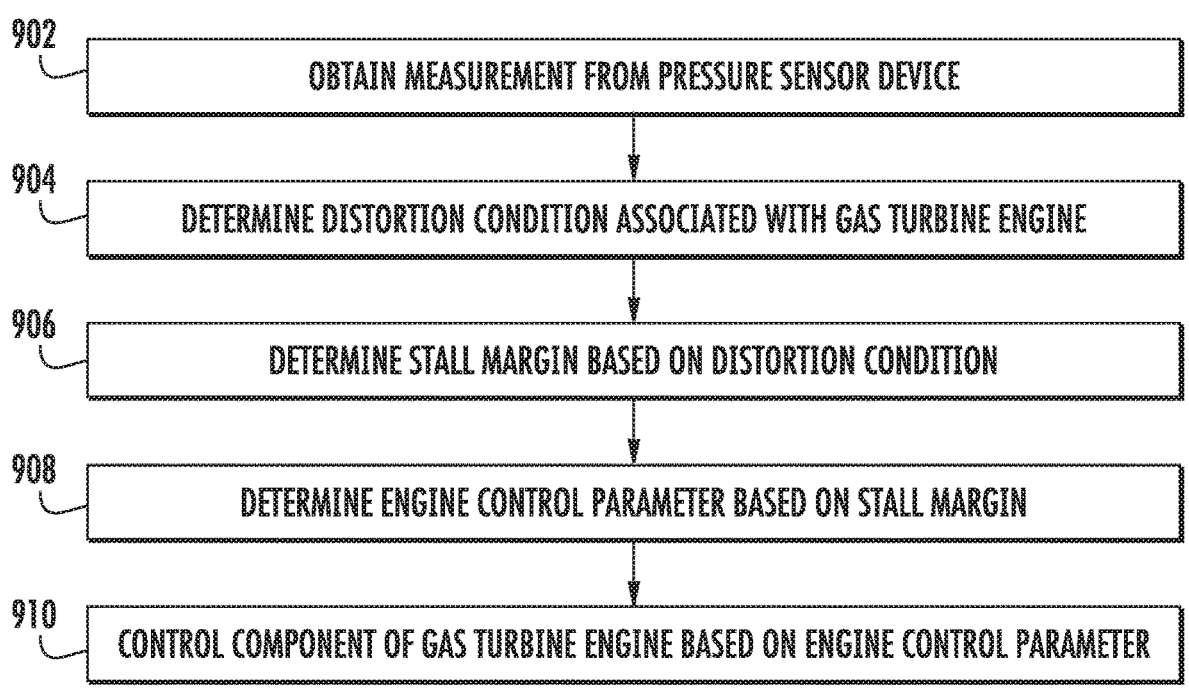
FIG. 9 depicts a flow diagram of an example method according to example embodiments of the present disclosure.

FIG. 9 depicts a flow diagram of an example method (900) according to example embodiments of the present disclosure. FIG. 9 can be implemented by one or more control devices, such as the control device 500 depicted in FIG. 5. In addition, FIG. 9 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (902), the method can include obtaining measurements from a pressure sensor device. The pressure measurements can be obtained by, for example, the instrumented guide vane 400 according to example embodiments of the present disclosure depicted in, for instance, FIGS. 3 and 4. Alternatively, the measurements can be obtained from any other suitable pressure sensor device.

At (904), the method can include determining a distortion condition associated with a gas turbine engine. For example, the distortion condition could be an air pressure differential in the circumferential plane of the gas turbine engine 10, such that portions of the LP compressor 22 are at or below pressures sufficient to cause stall conditions. The distortion condition can be determined by a distortion condition assessment 606, as depicted in FIG. 6, based on the inlet pressure measurements and a reference pressure calibration 610.

At (906), the method can include determining a stall margin based on the distortion condition. The stall margin can be determined, for instance, by adjusting a nominal stall margin 608 based on a distortion condition assessment 606. For example, a nominal stall margin can be increased to provide sufficient stall margin headroom to account for airflow distortion in the engine airflow path 64.

At (908), an engine control parameter can be determined based on the stall margin. The engine control parameter can be a variable geometry trim that can be used to determine an optimized position of a component of the gas turbine engine 10, such as a variable guide vane 104, a variable bleed valve 110, or a variable core inlet device 112.

At (910), a component of the gas turbine engine can be controlled based on the engine control parameter. For example, the array of variable guide vanes 104 depicted in FIG. 7 can be controlled by a variable geometry demand as depicted in FIG. 6. A variable geometry demand can be determined based on the desired pitch of the array of variable guide vanes 104 and a variable geometry reference schedule. The array of variable guide vanes 104 can then be opened to increase or closed to decrease the first portion of air 60 from flowing into the LP compressor 22, thereby increasing or decreasing the air pressure downstream of LP compressor 22. In turn, this can cause the gas turbine engine 10 to operate either closer to the predicted stall line or further away, thereby increasing or decreasing the stall margin. According to example aspects of method 900, the gas turbine engine 10 can thereby be operated at an adjusted stall margin of the gas turbine engine 10 based on airflow distortion.

Figure 10:
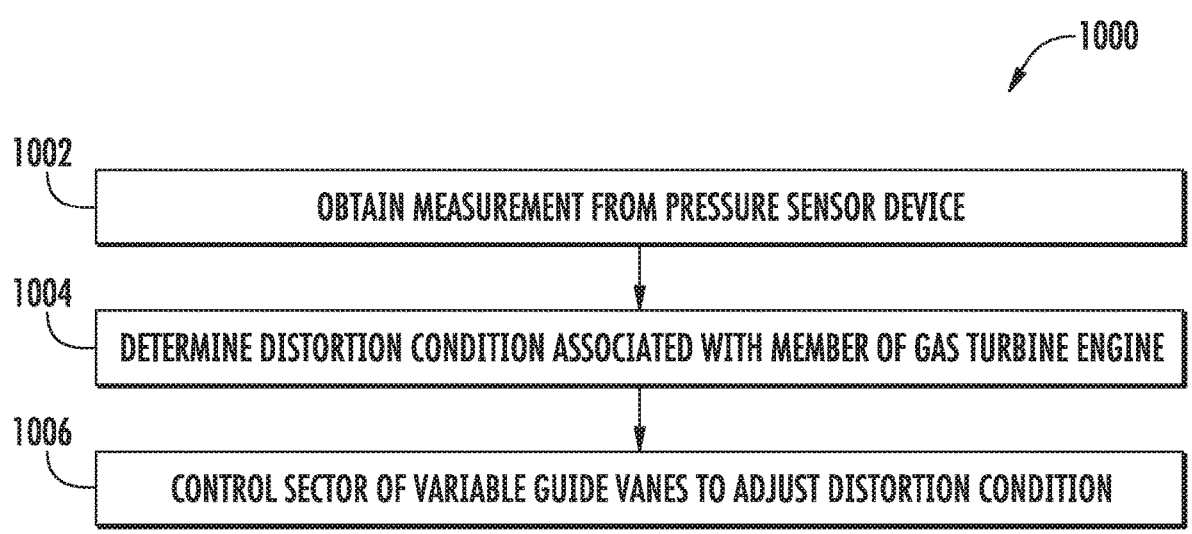
FIG. 10 depicts a flow diagram of an example method according to example embodiments of the present disclosure.

FIG. 10 depicts a flow diagram of an example method (1000) according to example embodiments of the present disclosure. FIG. 10 can be implemented by one or more control devices, such as the control device(s) 500 depicted in FIG. 5. In addition, FIG. 10 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (1002), the method can include obtaining measurements from a pressure sensor device. The pressure measurements can be obtained by, for example, the instrumented guide vane 400 according to example aspect of the present disclosure depicted in, for instance, FIGS. 3 and 4. Alternatively, the measurements can be obtained from any other suitable pressure sensor device.

At (1004), the method can include determining a distortion condition associated with a gas turbine engine. For example, the distortion condition could be an air pressure differential in the circumferential plane of the gas turbine engine 10, such that portions of the LP compressor 22 are at or below pressures sufficient to cause stall conditions. The distortion condition can be determined by a distortion condition assessment 606, as depicted in FIG. 6, based on the inlet pressure measurements and a reference pressure calibration 610.

At (1006), the method can include controlling a sector of variable guide vanes to adjust the distortion condition. For example, a sector of variable guide vanes 104 can be controlled to open or close in response to airflow distortion associated with that sector as depicted in FIG. 7. In this way, a sector of variable guide vanes can adjust the airflow distortion associated with the sector.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine for an aircraft comprising:
    an outer casing located downstream of a fan defining an annular inlet, the outer casing encasing a compressor section, a combustion section, and a turbine section in series flow, the compressor section, the combustion section, and the turbine section defining an engine airflow path for the gas turbine engine, and the annular inlet providing a first pathway for a first portion of air to enter the engine airflow path;
    a variable core inlet device located downstream of the annular inlet and upstream of the compressor section, the variable core inlet device defining a secondary airflow passage for a second portion of air to enter the engine airflow path;
    one or more members extending at least partially into the engine airflow path of the compressor section of the gas turbine engine, the one or more members comprising one or more variable guide vanes located downstream of the annular inlet; and
    one or more pressure sensor devices at least partially integrated into the one or more members extending at least partially into the engine airflow path, the one or more pressure sensor devices configured to obtain one or more measurements for determining a distortion condition for the gas turbine engine, the one or more pressure sensor devices configured to obtain the one or more measurements across two or more surfaces of a member of the one or more members;

wherein the one or more pressure sensor devices comprise one or more transducers; and wherein the variable core inlet device is configured to open or close in response to the distortion condition.

2. The gas turbine engine of claim 1, wherein the one or more pressure sensor devices are at least partially integrated into the one or more variable guide vanes.

3. The gas turbine engine of claim 2, wherein the one or more pressure sensor devices comprise one or more taps extending through at least one of the one or more variable guide vanes.

4. The gas turbine engine of claim 3, wherein the one or more taps comprise a plurality of taps, wherein each tap of the plurality of taps defines an inlet.

5. The gas turbine engine of claim 3, wherein the one or more pressure sensor devices comprise a plurality of taps, wherein each tap of the plurality of taps defines an inlet, and wherein the inlet of at least one of the plurality of taps is spaced along a suction side and the inlet of at least one of the plurality of taps is spaced along a pressure side of the one or more variable guide vanes.

6. The gas turbine engine of claim 5, wherein the plurality of taps is configured to determine a pressure differential between the suction side and the pressure side of the one or more variable guide vanes.

7. The gas turbine engine of claim 1, further comprising:
an array comprising the one or more variable guide vanes, the array divided into a plurality of sectors each comprising at least one variable guide vane; and
one or more controllers configured to determine the distortion condition based at least in part on the one or more measurements obtained by the one or more pressure sensor devices and to control one or more of the plurality of sectors of variable guide vanes based at least in part on the distortion condition and/or to control the variable core inlet device based at least in part on the distortion condition.

8. The gas turbine engine of claim 1, further comprising:
a variable bleed valve downstream of the one or more variable guide vanes.

9. The gas turbine engine of claim 1, wherein the one or more members additionally comprise one or more struts, wherein the one or more pressure sensor devices are at least partially integrated into the one or more struts.

10. The gas turbine engine of claim 1, further comprising:
one or more controllers configured to determine the distortion condition based at least in part on the one or more measurements obtained by the one or more pressure sensor devices.

11. The gas turbine engine of claim 10, wherein the one or more controllers are configured to control one or more variable geometry components of the gas turbine engine based at least in part on the distortion condition.

12. The gas turbine engine of claim 1, wherein the one or more transducers are configured to convert a pressure measurement into an electronic signal.

13. The gas turbine engine of claim 1, wherein the gas turbine engine defines a circumferential direction, wherein the one or more pressure sensor devices comprise a plurality of pressure sensor devices, and wherein pressure sensor devices of the plurality of pressure sensor devices are spaced about the circumferential direction of the gas turbine engine.

14. The gas turbine engine of claim 1, wherein the gas turbine engine defines a radial direction, wherein the one or more pressure sensor devices comprise a plurality of pressure sensor devices, and wherein pressure sensor devices of the plurality of pressure sensor devices are spaced at different positions along the radial direction of the gas turbine engine.

15. A gas turbine engine, comprising:
an outer casing downstream of a fan defining an annular inlet, the outer casing encasing a compressor section, a combustion section, and a turbine section in series flow, the compressor section, the combustion section, and the turbine section defining an engine airflow path for the gas turbine engine, and the annular inlet providing a first pathway for a first portion of air to enter the engine airflow path;
a variable core inlet device located downstream of the annular inlet and upstream of the compressor section, the variable core inlet device defining a secondary airflow passage for a second portion of air to enter the engine airflow path;
a variable guide vane for guiding airflow through the compressor section of the gas turbine engine, the variable guide vane comprising:
a leading edge, a pressure side, and a suction side, the leading edge, the pressure side, and the suction side configured to extend at least partially into the engine airflow path of the compressor section of the gas turbine engine; and
one or more pressure sensor devices configured to obtain one or more measurements for determining a distortion condition, the one or more pressure sensor devices at least partially integrated into the variable guide vane, the one or more pressure sensor devices configured to obtain the one or more measurements across two or more of the leading edge, the pressure side, and the suction side;
wherein the one or more pressure sensor devices comprise one or more transducers;
wherein the variable guide vane is situated in a manner at least partially extending into the engine airflow path of the compressor section of the gas turbine engine; and
wherein the variable core inlet device is configured to open or close in response to the distortion condition.

16. The gas turbine engine of claim 15, wherein the one or more pressure sensor devices comprise one or more taps extending through the variable guide vane.

17. The gas turbine engine of claim 16, wherein the one or more taps comprise a plurality of taps, wherein each tap of the plurality of taps defines an inlet.

18. The gas turbine engine of claim 16, wherein the one or more taps comprise a plurality of taps, wherein each tap of the plurality of taps defines an inlet, and wherein the inlet of at least one of the plurality of taps is spaced along a suction side and the inlet of at least one of the plurality of taps is spaced along the pressure side of the variable guide vane.

19. The gas turbine engine of claim 18, wherein at least some of the plurality of taps are configured to determine a pressure differential between the suction side and the pressure side of the variable guide vane.

20. The gas turbine engine of claim 15, wherein the one or more transducers are configured to convert a pressure measurement into an electronic signal.

* * * * *